United States Patent
Huang

(10) Patent No.: US 8,470,898 B2
(45) Date of Patent: Jun. 25, 2013

(54) METHODS OF MAKING LITHIUM ION BATTERY SEPARATORS

(75) Inventor: Xiaosong Huang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 230 days.

(21) Appl. No.: 13/149,205

(22) Filed: May 31, 2011

(65) Prior Publication Data

US 2012/0309860 A1 Dec. 6, 2012

(51) Int. Cl.
*C08J 9/00* (2006.01)
*H01M 2/16* (2006.01)

(52) U.S. Cl.
USPC ............. 521/63; 521/64; 521/91; 429/249; 429/251; 429/252; 429/254

(58) Field of Classification Search
USPC ............. 521/66, 64.91; 429/249, 251, 252, 429/254
See application file for complete search history.

(56) References Cited

U.S. PATENT DOCUMENTS

| | | | |
|---|---|---|---|
| 7,109,140 B2 * | 9/2006 | Marand et al. | 502/4 |
| 7,767,348 B2 * | 8/2010 | Nagayama et al. | 429/246 |
| 2006/0019154 A1 * | 1/2006 | Imachi et al. | 429/144 |
| 2008/0038631 A1 * | 2/2008 | Nakura et al. | 429/144 |
| 2010/0112432 A1 * | 5/2010 | Nishida et al. | 429/144 |

OTHER PUBLICATIONS

U.S. Appl. No. 12/974,094; Title: Battery Separators With Variable Porosity; Filed: Dec. 10, 2010; First Named Inventor: Hamid G. Kia.
U.S. Appl. No. 12/974,269; Title: Battery Separators With Variable Porosity; Filed Dec. 10, 2010; First Named Inventor: Hamid G. Kia.
U.S. Appl. No. 13/045,563; Title: Integral Bi-Layer Separator-Electrode Construction For Lithium-Ion Batteries; Filed: Mar. 11, 2011 First Named Inventor: Xiaosong Huang.
U.S. Appl. No. 13/217,455; Title: Lithium Ion Battery With Electrolyte-Embedded Separator Particles; Filed: Aug. 25, 2011; First Named Inventor: Ion C. Halalay.
U.S. Appl. No. 13/149,117; Title: Separators For A Lithium Ion Battery; Filed: May 31, 2011; First Named Inventor: Xiaosong Huang.

* cited by examiner

*Primary Examiner* — Irina S Zemel
(74) *Attorney, Agent, or Firm* — Reising Ethington P.C.

(57) ABSTRACT

A porous thin-film polymer separator for use in a lithium ion battery may be formed by a phase separation method in which hydrophobic-treated ceramic particles are used to help induce the formation of a tortuous, interconnected network of pores coextensively across the thickness of the separator. As part of the phase separation method, a wet thin-film layer is formed from a polymer slurry that comprises a polymer solvent in which a polymer material is dissolved and the hydrophobic-treated ceramic particles are dispersed. The wet thin-film layer is subsequently exposed to a polymer non-solvent to form a solvent-exchanged thin-film precipitated polymer layer which is then heated to produce the separator.

20 Claims, 2 Drawing Sheets

METHODS OF MAKING LITHIUM ION BATTERY SEPARATORS

TECHNICAL FIELD

The technical field of this disclosure relates generally to separators for a secondary lithium ion battery and, more specifically, to separators formed by a phase separation method. The use of small, hydrophobic-treated ceramic particles during the phase separation method helps form a tortuous, interconnected network of pores across the thickness of the resultant separator. In an electrochemical battery cell of a lithium ion battery, the separator is situated between confronting inner face surfaces of a positive electrode and a negative electrode and is soaked with a liquid electrolyte solution that can communicate lithium ions.

BACKGROUND

Secondary (i.e., rechargeable) lithium ion batteries have been implemented as a power source into a wide variety of stationary and portable applications. Their structure and electrochemical reaction mechanism provide them with several desirable characteristics including a relatively high energy density, a relatively low internal resistance, a general non-appearance of any memory effect when compared to other types of rechargeable batteries, for example, nickel-cadmium batteries, and a low self-discharge rate. These characteristics have made lithium ion batteries the preferred mobile power source for portable consumer electronics such as laptop computers and cell phones. Larger-scale versions that interact with a multitude of interconnected systems have also been designed and manufactured by the automotive industry in an effort to improve vehicle fuel efficiency and reduce atmospheric pollution. The powertrains of hybrid electric vehicles (HEV) and extended range electric vehicles (EREV), for example, rely on the cooperative effort of lithium ion batteries and a hydrocarbon-fueled internal combustion engine to generate torque for vehicle propulsion.

A lithium ion battery generally contains one or more electrochemical battery cells that include a negative electrode, a positive electrode, and a porous polymeric separator sandwiched between the confronting inner face surfaces of the electrodes. The negative electrode generally includes a lithium host material that stores intercalated lithium at a relatively low electrochemical potential (relative to a lithium metal reference electrode). The positive electrode generally includes a lithium-based active material that stores intercalated lithium at a higher electrochemical potential than the lithium host material (relative to the same lithium metal reference electrode). The interadjacent porous separator includes opposed major surfaces that intimately contact the confronting inner face surfaces of the electrodes. A main function of the separator is to provide a porous and electrically insulative mechanical support barrier between the negative and positive electrodes to prevent a short-circuit in the cell. Each of the negative electrode, the positive electrode, and the separator is wetted with a liquid electrolyte solution that can communicate lithium ions. The liquid electrolyte solution is typically a lithium salt dissolved in a non-aqueous liquid solvent.

An interruptible external circuit electrically connects the negative electrode and the positive electrode to provide an electrical current path around the separator to electrochemically balance the migration of lithium ions. Metallic current collectors intimately associated with each electrode supply and distribute electrons to and from the external circuit depending on the operating state of the electrochemical battery cell. The external circuit can be coupled to an electrical load (during discharge) or an applied voltage from an external power source (during charging) through conventional electronic connectors and related circuitry. A voltage of approximately 2.5V to 4.3V is usually attained in each electrochemical battery cell during battery discharge. Greater overall battery power levels can be achieved, if necessary, by linking together a suitable number of similar electrochemical battery cells with their negative and positive electrodes connected in series or in parallel to corresponding common terminals. Current lithium ion batteries intended to be used in a vehicle powertrain typically include anywhere from 10 to 150 individual electrochemical battery cells. Several of these lithium ion batteries can be further connected in series or in parallel and packaged together to form a lithium ion battery pack that achieves a desired overall voltage and current capacity.

Conventionally, the porous polymeric separator has been composed of a polyolefin such as polyethylene and/or polypropylene. A number of fabrication methods have been developed for making a polyolefin separator with its intended porosity. The separator may be formed by a dry technique in which the polyolefin polymer is melted, extruded into a film, annealed, and then uniaxially stretched. The annealing and stretching phases produce and refine tightly ordered pores throughout the bulk interior of the resultant separator. The separator may also be formed by a wet technique in which the polyolefin polymer is mixed with a hydrocarbon or other low-molecular weight liquid substance. The mixture is then heated, melted, and formed into a film. Afterwards, the hydrocarbon or other low-molecular weight liquid substance is extracted. The extraction of the hydrocarbon or other low-molecular weight liquid substance induces pore formation throughout the resultant separator. Further refinement of the pores can be achieved by stretching or drawing the separator if desired.

But lifetime and performance declines are a concern for an electrochemical battery cell that includes a polyolefin separator. Exposure of the electrochemical cell to temperatures of 100° C. and above can cause the polyolefin separator to shrink, soften, and even melt if the temperature approaches 130° C. Such high temperatures can be attributed to charging-phase heat generation, ambient atmospheric temperature, or some other source. The temperature-initiated physical distortion of the polyolefin separator may ultimately permit direct electrical contact between the negative and positive electrodes and cause the electrochemical cell to short-circuit. Battery thermal runaway is also a possibility if the electrodes come into direct electrical contact with one another to an appreciable extent.

A variety of engineering polymers that exhibit better thermal stability than polypropylene and polyethylene have been investigated as candidates for a lithium ion battery separator. But the separator fabrication methods often used for polyolefin separators generally cannot provide these types of polymers with a sufficient porosity across their thickness. The porosity of the separator is not a physical property to be taken lightly as it impacts the performance and longevity of the electrochemical battery cell. A separator with insufficient porosity impedes lithium ion migration between the electrodes while a separator with too much porosity is susceptible lithium dendrite crossover from the negative electrode. A fabrication method that can reliably produce, from a variety of engineering polymers, a thermally stable polymer separator having a uniform, tortuous interconnected network of pores defined coextensively throughout the separator is therefore needed.

SUMMARY OF THE DISCLOSURE

A porous thin-film polymer separator that exhibits better thermal stability than a conventional polyolefin separator may be prepared by a phase separation method. The thin-film polymer separator is fabricated from a polymer slurry that comprises a polymer solvent in which a polymer material is dissolved and hydrophobic-treated ceramic particles are dispersed. The polymer slurry is formed into a wet thin-film layer which is subsequently exposed to a polymer non-solvent to effectuate solvent exchange and produce a solvent-exchanged thin-film precipitated polymer layer. The small, hydrophobic-treated ceramic particles are included in the polymer slurry to refine the pores and crevices formed when the polymer material precipitates around them either before and/or during exposure of the wet thin-film layer to the polymer non-solvent. After exposure to the polymer non-solvent, the solvent-exchanged thin-film precipitated polymer layer is heated to evaporate any remaining polymer solvent and the polymer non-solvent. The uniformly distributed hydrophobic-treated ceramic particles and the solvent exchange mechanism (polymer non-solvent for polymer solvent) cooperatively effectuate a tortuous, interconnected network of pores across the thickness of the resultant separator.

The polymer slurry can be formed into the wet thin-film layer by any suitable technique such as, for example, doctor blading, spraying, or slot die coating. The thickness of the wet-film layer is generally greater than the intended thickness of the prepared thin-film polymer separator by up to about 30% to account for shrinkage. Any of a wide variety of polymer materials and hydrophobic-treated ceramic particles may be introduced into the polymer solvent to form the polymer slurry. The amounts of the polymer material and the hydrophobic-treated ceramic particles included in the polymer slurry are selected so that the thin-film polymer separator is fabricated as intended. Preferably, the polymer slurry comprises about 5 wt. % to about 35 wt. % of the polymer material and about 5 wt. % to about 900 wt. % of the hydrophobic-treated ceramic particles based on the weight of the polymer material.

The polymer material may be comprised of any polymer composition that is thermally stable in the operating environment of the lithium ion battery. Suitable polymer materials include polyetherimide (PEI), polyvinylidene fluoride (PVdF), polyethersulfone (PES), polysulfone (PSf), polyphenylsulfone (PPSf), polyacrylonitrile (PAN), poly(methyl methacrylate) (PMMA), an aliphatic polyimide (PA) such as polyhexamethylene adiptimide and polycaprolactam, and mixtures thereof. These polymer materials are considered engineering polymers. Each of them is thermally stable above 150° C. and, as such, can maintain its functionality for longer durations than a conventional polyolefin if the temperature in the lithium ion battery unexpectedly rises. The polymer material dissolved in the polymer solvent eventually precipitates out of the polymer slurry through a phase separation mechanism and forms a polymer material matrix after heating of the solvent-exchanged thin-film precipitated polymer layer.

The hydrophobic-treated ceramic particles dispersed throughout the polymer slurry preferably have particle diameters of about 0.005 µm to about 15 µm and, most preferably, from about 0.05 µm to about 3 The hydrophobic treatment imposed on the ceramic particles is any process that renders their surfaces more hydrophobic relative to their natural prepared state. The hydrophobic treatment imparted to the ceramic particles provides them with a weak, non-wetting surface interface that promotes pore and gap formation in their immediate vicinity during precipitation of the polymer material. These weak surface interactions between the hydrophobic-treated ceramic particles and the precipitating polymer material help propagate the tortuous and interconnected network of pores that is coextensively defined throughout and across the polymer material matrix of the prepared separator. A specific and most preferred hydrophobic-treated ceramic particle is fumed (pyrogenic) silica that has been surface modified with organosilicon compounds by way of a silanol condensation reaction.

The polymer solvent in which the polymer material is dissolved and the hydrophobic-treated ceramic particles are dispersed may be a latent polymer solvent or a real polymer solvent with regards to the polymer material. A latent polymer solvent is a solvent that will not dissolve the polymer material at room temperature but will at elevated temperatures. A real polymer solvent is a solvent that will dissolve the polymer material at room temperature. The use of a latent polymer solvent or a real polymer solvent dictates the phase separation mechanism by which the polymer material precipitates out of the polymer slurry layer but generally does not impart a distinction in the composition or function of the porous thin-film polymer separator ultimately produced.

Specifically, a latent polymer solvent permits a portion of the polymer material to precipitate by thermally-induced phase separation before and/or during exposure of the wet thin-film layer to the polymer non-solvent. For instance, in one embodiment, the polymer material is dissolved in the latent polymer solvent at an elevated temperature conducive to polymer material solvation. The wet thin-film layer is then formed and allowed to cool. The falling temperature of the wet thin-film layer invokes precipitation of the polymer material. Any portion of the polymer material still dissolved at room temperature is eventually precipitated when the wet thin-film layer is exposed to the polymer non-solvent. In another embodiment, the wet thin-film layer is exposed to the polymer non-solvent immediately before being allowed to cool. The ensuing temperature drop of the wet thin-film layer and exposure to the polymer non-solvent both simultaneously invoke precipitation of the polymer material. A real polymer solvent, on the other hand, generally prevents the polymer material from precipitating out of the polymer slurry at room temperature before solvent exchange occurs. Rather, substantially all of the polymer material included in the solvent-exchanged thin-film precipitated polymer layer is precipitated out of the polymer slurry during exposure to the polymer non-solvent.

The wet thin-film layer—whether partially precipitated already or not—can be exposed to the polymer non-solvent by any suitable fashion. A polymer non-solvent is a solvent which does not dissolve more than a negligible amount of the polymer material. The wet thin-film layer is exposed to the polymer non-solvent for a time sufficient to exchange at least 70 wt. %, and preferably at least 95 wt. %, of the polymer solvent contained in the wet thin-film layer. The substitution of the polymer solvent with the polymer non-solvent forms the solvent-exchanged thin-film precipitated polymer layer. This layer contains most of the originally-dissolved polymer material as a wet polymer precipitate that is uniformly laden with an internal dispersal of the hydrophobic-treated ceramic particles. The polymer non-solvent is also significantly intermingled within the wet polymer precipitate but phase separated at this point. The solvent-exchanged thin-film precipitated polymer layer is basically the same in terms of composition and function regardless of the polymer solvent used to make the polymer slurry.

The solvent-exchanged thin-film precipitated polymer layer can be heated by any suitable technique to evaporate the polymer solvent, if any, and the polymer non-solvent to form the porous thin-film polymer separator. The removal of the solvents dries the wet polymer precipitate contained in the solvent-exchanged thin-film precipitated polymer layer into the polymer material matrix. The evaporation of the polymer non-solvent, moreover, leaves behind empty pores and crevices that provide the thin-film porous polymer separator with its ascribed porosity in cooperation with the weak interfacial surface affects attributed to the uniformly dispersed hydrophobic-treated ceramic particles. After removal of the polymer solvent and the polymer non-solvent, the porous thin-film polymer separator comprises about 10 wt. % to about 95 wt. % of the polymer material matrix and about 5 wt. % to about 90 wt. % of the hydrophobic-treated ceramic particles distributed throughout the polymer material matrix.

The prepared thin-film polymer separator includes opposed major face surfaces that define a separator thickness ranging from about 20 µm to about 50 µm. The types of engineering polymer materials used to fabricate the polymer material matrix (i.e., PEI, PVdF, etc.) offer better thermal stability at temperatures of 130° C. and above and improved ionic conductance in comparison to polyolefins such as polypropylene and polyethylene. The ability of the porous thin-film separator to accommodate a liquid electrolyte solution and, therefore, communicate lithium ions from one side to the other, is supported by the tortuous and interconnected network of pores that coextensively traverses the polymer material matrix and fluidly connects the opposed major face surfaces. The network of interconnected pores provides the polymer material matrix with a void volume that ranges from about 20% to about 80%.

The porous thin-film separator is intended to be used in the assembly of an electrochemical battery cell for a lithium ion battery. The separator may be situated between a negative electrode and a positive electrode and be infiltrated with an appropriate liquid electrolyte solution. The separator electrically insulates and physically separates the electrodes to prevent a short-circuit while remaining permeable to the internal passage of lithium ions (and related anions) by way of the liquid electrolyte solution. When assembled, the entire thickness of the electrochemical cell (positive electrode, negative electrode, and separator) is usually between about 80 µm and about 350 µm. A plurality of these electrochemical cells, often numbering from 10 to 150, can be connected in series or in parallel with many other electrochemical cells to form a lithium ion battery which, in turn, can be connected in series or in parallel with several other lithium ion batteries to form a lithium ion battery pack. The relatively thin and flexible nature of the electrochemical cells allows them to be rolled, folded, bent, or otherwise maneuvered into a variety of lithium ion battery configurations depending on design specifications and spatial constraints.

DETAILED DESCRIPTION OF PREFERRED EMBODIMENTS

Figure 1:
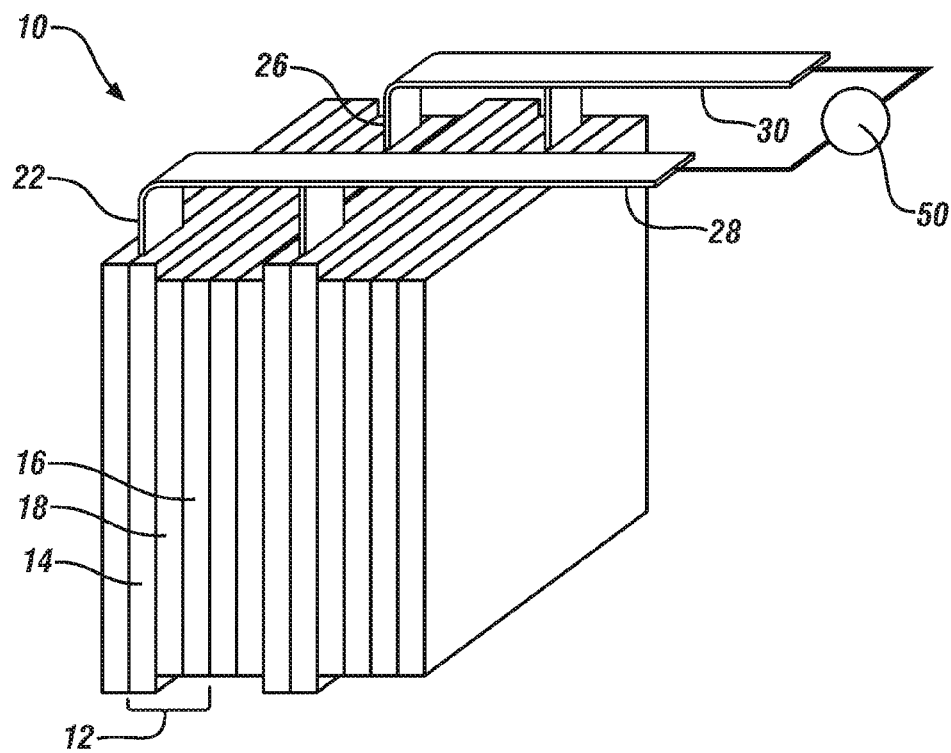
FIG. 1 is a generalized perspective illustration of a lithium ion battery that includes several adjacent electrochemical battery cells, each of which includes a negative electrode, a positive electrode, and a separator sandwiched between the two electrodes.

A method of making a porous, thin-film polymer separator for a lithium ion battery that involves phase separation may employ hydrophobic-treated ceramic particles to affect the structural properties of the separator. The prepared thin-film polymer separator is normally about 20 µm to about 50 µm thick and comprises a polymer material matrix with a uniform internal distribution of the hydrophobic-treated ceramic particles. The polymer material includes oppositely oriented major face surfaces that experience interfacial contact with confronting inner face surfaces of a negative electrode and a positive electrode when assembled in an electrochemical battery cell of a lithium ion battery. A tortuous and interconnected network of pores coextensively traverses the polymer material matrix across its thickness and permits intrusion of a liquid electrolyte solution so that lithium ions can migrate from one side of the separator to the other. The network of interconnected pores provides the polymer material matrix with a void volume that ranges from about 20% to about 80% and a low MacMullin number (i.e., less than 15). The use of the hydrophobic-treated ceramic particles during the phase separation method ensures this kind of uniform pore structure.

The phase separation method generally involves, first, forming a polymer slurry into a wet thin-film layer of a desired thickness. The polymer slurry includes a polymer solvent in which a polymer material is dissolved and the hydrophobic-treated ceramic particles are uniformly dispersed. A latent polymer solvent or a real polymer solvent may be used to form the polymer slurry. The wet thin-film layer is subsequently exposed to a polymer non-solvent so that solvent exchange occurs and a solvent-exchanged thin-film precipitated polymer layer is formed. At least 70 wt. % of the polymer solvent contained in the wet thin-film layer is preferably replaced with the polymer non-solvent. After solvent exchange, the solvent-exchanged thin-film precipitated polymer layer is heated to evaporate any remaining polymer solvent as well as the polymer non-solvent. The evaporation of the polymer solvent and the polymer non-solvent forms the porous thin-film polymer separator complete with the tortuous and interconnected network of pores that extends coextensively through the polymer material matrix. The prepared thin-film polymer separator comprises about 10 wt. % to about 95 wt. % of the polymer material matrix and about 5 wt. % to about 90 wt. % of the internally distributed hydrophobic-treated ceramic particles.

The polymer slurry may be prepared by dissolving the polymer material and dispersing the hydrophobic-treated ceramic particles into a polymer solvent under continuous mechanical stirring. Any suitable technique including spraying, doctor blading, slot die coating, comma bar coating, or liquid extrusion may be used to form the polymer slurry into the wet thin-film layer at a desired thickness. The thickness of the wet thin-film layer is generally chosen so that the final prepared separator is anywhere from about 20 µm to about 50 µm thick. The wet thin-film layer may be formed onto a conveyor belt, a support belt, or a movable or immovable flat substrate surface such as a glass or ceramic sheet. Other conventional preparation and forming techniques may of course be utilized, as understood by skilled artisans, to accomplish the general objectives just described. The amounts of the polymer material and the hydrophobic-treated ceramic particles included in the polymer slurry are selected so that the thin-film polymer separator is fabricated as intended. Preferably, the polymer slurry comprises about 5 wt. % to about 35 wt. % of the polymer material. The hydrophobic-treated ceramic particles are present in the polymer slurry at an amount that ranges from about 5 wt. % to about 900 wt. %, and more preferably from about 10 wt. % to about 100 wt. %, based on the weight of the polymer material.

Any of a wide variety of polymer materials and hydrophobic-treated ceramic particles may be introduced into the polymer solvent to form the polymer slurry. The polymer material is eventually precipitated out of the polymer slurry through a phase separation mechanism and formed into the polymer material matrix after heating. The hydrophobic-treated ceramic particles dispersed within the polymer slurry each exhibit a weak, non-wetting surface interface that promotes pore and gap formation in their immediate vicinity during precipitation of the polymer material. Such weak surface interactions between the hydrophobic-treated ceramic particles and the precipitating polymer material helps breed the tortuous and interconnected network of pores that is coextensively defined throughout and across the polymer material matrix when a sufficient and well-dispersed amount of the hydrophobic-treated ceramic particles is present.

The polymer material may be comprised of any polymer composition that is thermally stable and generally chemically inert to the liquid electrolyte solution in the operating environment of the lithium ion battery. Some exemplary polymer materials that may be employed include polyetherimide (PEI), polyvinylidene fluoride (PVdF), polyethersulfone (PES), polysulfone (PSf), polyphenylsulfone (PPSf), polyacrylonitrile (PAN), poly(methyl methacrylate) (PMMA), an aliphatic polyamide (PA) such as polyhexamethylene adiptimide and polycaprolactam, and mixtures thereof. Each of these polymer materials is considered an engineering polymer and is thermal stable above 150° C. Such heat resistance allows these polymers to maintain their functionality for longer durations than a conventional polyolefin if the temperature in the lithium ion battery unexpectedly rises. PEI and PVdF are the most preferred polymer materials because they are the easiest to manufacture into the thin-film polymer separator and provide a good balance of mechanical and electromechanical performance.

The hydrophobic-treated ceramic particles dispersed throughout the polymer slurry may be those of alumina, titania, silica, ceria, zirconia, silicon carbide, boron carbide, titanium nitride, silicon nitride, titanium silicide, tungsten silicide, aluminum boride, titanium boride, mullite, spodumene, zirconium silicate, sillimanite, and petalite, or a mixture that includes one or more of these ceramic particles. They preferably have particle diameters of about 0.005 µm to about 15 µm and, most preferably, from about 0.05 µm to about 3 µm. The hydrophobic treatment imposed on the ceramic particles can be any process that renders their surfaces more hydrophobic relative to their natural prepared state. Ceramic particles, for instance, generally contain residual surface hydroxyl groups that render them hydrophilic. These surface hydroxyl groups can be substituted with longer-chain, hydrophobic, organosilicon polymer compounds through silanol condensation reactions to modify, from hydrophilic to hydrophobic, the affinity for water experienced at the ceramic particles' surfaces.

A specific and most preferred hydrophobic-treated ceramic particle is fumed (pyrogenic) silica that has been surface modified with organosilicon compounds by way of a silanol condensation reaction. Fumed silica particles are usually prepared through the flame pyrolysis of silicon tetrachloride or quartz sand. Several different companies commercially manufacture such hydrophobic-treated finned silica particles. AEROSIL® R202 and AEROSIL® R805, for example, can be obtained from Evonik Degussa Corporation (Parsippany, N.J.), AEROSIL® R202 is a high-purity, fumed silica particulate that has been surface-treated with a polydimethylsiloxane. AEROSIL® R805 is a high-purity, fumed silica particulate that has been surface-treated with an octylsilane. As another example, CAB-O-SIL® TS-382 and CAB-O-SIL® TS-720 can be obtained from Cabot Corporation (Boston, Mass.). CAB-O-SIL® TS-382, which is similar to AEROSIL® R805, is a high-purity, fumed synthetic silica particulate that has been surface-treated with an octylsilane. CAB-O-SIL® TS-720, which is similar AEROSIL® R202, is a high-purity, fumed synthetic silica particulate that has been surface-treated with a polydimethylsiloxane. Each of these products contain surface-substituted organisilicon polymers derived from polydimethylsiloxane (AEROSIL® R202 and CAB-O-SIL® TS-720) or octylsilane (AEROSIL® R805 and CAB-O-SIL® TS-382) in lieu of hydroxyl groups as a result of silanol condensation reactions.

The polymer solvent included in the polymer slurry may be a latent polymer solvent or a real polymer solvent. A latent polymer solvent is a solvent that dissolves no more than 1.0 wt. % the polymer material at room temperature but will at elevated temperatures. A real solvent is a solvent that dissolves a minimum of 5 wt. % of the polymer solvent at room temperature. The use of a latent polymer solvent or a real polymer solvent dictates the phase separation mechanism by which the polymer material precipitates out of the polymer slurry, as further explained below, but generally does not impart a distinction in the composition or function of the porous thin-film polymer separator ultimately produced. Whether a polymer solvent is categorized as a latent polymer solvent or a real polymer solvent usually depends on the particular polymer material being dissolved. A polymer solvent may be a latent polymer solvent for one type of polymer material and a real polymer solvent for another type. A non-exhaustive list of preferred latent polymer solvents and real solvents for the several polymer materials previously mentioned is shown below in Table 1.

TABLE 1

Polymer Solvents for Various Polymer Materials

| Polymer Material | Polymer Solvent | |
|---|---|---|
| | Latent Polymer Solvent | Real Polymer Solvent |
| PEI | Dimethyl Formamide (DMF), Tetrahydrofuran (THF) | N-Methyl-2-Pyrrolidone (NMP) |
| PVdF | Acetone, Methyl Isobutyl Ketone, Dimethyl Phthalate | N-Methyl-2-Pyrrolidone (NMP), Dimethyl Formamide (DMF) |
| PES | N/A | Tetrahydrofuran (THF) |
| PSf | Tetrahydrofuran (THF) | N-Methyl-2-Pyrrolidone (NMP), Dimethyl Formamide (DMF) |
| PPSf | Tetrahydrofuran (THF) | N-Methyl-2-Pyrrolidone (NMP), Dimethyl Formamide (DMF) |
| PAN | Propylene carbonate (PC) | N-Methyl-2-Pyrrolidone (NMP), Dimethyl Formamide (DMF) |

TABLE 1-continued

Polymer Solvents for Various Polymer Materials

| Polymer Material | Polymer Solvent | |
|---|---|---|
| | Latent Polymer Solvent | Real Polymer Solvent |
| PMMA | Tert-butyl alcohol | N-Methyl-2-Pyrrolidone (NMP), Dimethyl Formamide (DMF), Dimethyl sulfoxide (DMSO), acetone |
| Aliphatic PA | N/A | Acetic Acid |

The use of a latent polymer solvent in the polymer slurry permits thermally-induced phase separation to occur at room-temperature (i.e., about 18° C. to about 24° C.) or above before and/or during exposure of the wet thin-film layer to the polymer non-solvent. In one embodiment, the polymer material and the hydrophobic-treated ceramic particles are both introduced into the latent polymer solvent at an elevated temperature conducive to polymer material solvation and mixed by mechanical stirring or agitation. The polymer slurry is then formed into the wet thin-film layer at an appropriate thickness and allowed to cool. As the temperature decreases, the polymer material begins to precipitate out of the polymer slurry and the dispersed hydrophobic-treated ceramic particles start to settle and assume generally fixed locations within precipitating polymer material. This thermally-induced phase separation results in a wet polymer precipitate, which contains internally dispersed hydrophobic-treated ceramic particles, being present in the wet thin-film layer in addition to the latent polymer solvent and unconfined hydrophobic-treated ceramic particles. A small portion of the originally-dissolved polymer material remains dissolved in the latent polymer solvent. This remaining portion is precipitated later on when the wet thin-film layer is exposed to the polymer non-solvent. Alternatively, in another embodiment, the wet thin-film layer is exposed to the polymer non-solvent immediately before being cooled. The ensuing temperature drop of the wet thin-film polymer layer and exposure to the polymer non-solvent both simultaneously invoke precipitation of the polymer material.

The use of a real polymer solvent prevents substantial phase separation from occurring at room temperature before the wet thin-film layer is exposed to the polymer non-solvent to achieve solvent exchange. The polymer material and the hydrophobic-treated ceramic particles are both introduced into the real polymer solvent at room temperature or above and mixed by mechanical stirring or agitation. The polymer slurry is then formed into the wet thin-film layer at an appropriate thickness and, if previously heated, allowed to cool. Allowing the wet thin-film layer sit at room temperature for an extended period of time generally will not, by itself, induce precipitation of the polymer material, although the hydrophobic-treated ceramic particles may begin to slowly settle towards the bottom. The dissolved polymer material is eventually precipitated out of the polymer slurry with a uniform internal distribution of the hydrophobic-treated ceramic particles when the wet thin-film layer is exposed to the polymer non-solvent.

The wet thin-film layer—whether precipitated already or not—is then exposed to a polymer non-solvent. A polymer non-solvent is a solvent which does not solvate the polymer material more than a negligible amount such as, for example, water. The wet thin-film layer may be exposed to the polymer non-solvent by any suitable technique. For example, the wet thin-film layer may be washed with a flow of the polymer non-solvent, immersed in a bath of the polymer non-solvent, and/or placed in a chamber that confines vapor entrained droplets or a mist of the polymer non-solvent. But however accomplished, the wet thin-film layer is exposed to the polymer non-solvent for a time sufficient to exchange at least 70 wt. %, and preferably at least 95 wt. %, of the polymer solvent contained in the wet thin-film layer with the polymer non-solvent. The wet thin-film layer generally does not have to be exposed to the polymer non-solvent for very long to accomplish this degree of solvent exchange. A few seconds to a few minutes is usually all the time that is needed.

The substitution of the polymer solvent with the polymer non-solvent forms a solvent-exchanged thin-film precipitated polymer layer. This layer contains most of the originally-dissolved polymer material as a wet polymer precipitate that is uniformly laden with an internal dispersal of the hydrophobic-treated ceramic particles. Most of the originally-dispersed hydrophobic-treated ceramic particles are now confined and generally immobilized within the wet polymer precipitate. The polymer non-solvent, moreover, remains significantly intermingled within the wet polymer precipitate but phase separated at this point. The polymer non-solvent includes, at most, a negligible amount of dissolved inert polymer material and is present around the hydrophobic-treated ceramic particles and within the bulk wet polymer precipitate as small beads or other segregated or continuous liquid confinements. The eventual evaporation of the polymer non-solvent leaves behind empty pores and crevices that cooperatively provide the thin-film porous polymer separator with its ascribed porosity along with the weak interfacial surface affects attributed to the uniformly dispersed hydrophobic-treated ceramic particles.

The solvent-exchanged thin-film precipitated polymer layer is similar in terms of composition and function regardless of the polymer solvent used to make the polymer slurry. The two types of polymer solvents (latent and real) simply dictate different mechanisms by which the originally-dissolved polymer material is precipitated. If a latent polymer solvent is used, the polymer material is precipitated out of the polymer slurry when the wet thin-film layer is cooled and exposed to the polymer non-solvent, as previously explained. If a real polymer solvent is used, on the other hand, all of the polymer material is generally extracted and precipitated when the wet thin-film layer is exposed to the polymer non-solvent and the real polymer solvent is displaced.

The solvent-exchanged thin-film precipitated polymer layer is then heated to evaporate the polymer solvent, if any, and the polymer non-solvent to form the porous thin-film polymer separator. The heat needed to evaporate the polymer solvent and the polymer non-solvent can be supplied in any suitable manner. The solvent-exchanged thin-film precipitated polymer layer may be subjected to a stream of hot air or some other non-reactive gas, placed in an oven or furnace, or passed under a series of heat lamps, to name but a few possible heating techniques. Heating the solvent-exchanged thin-film precipitated polymer layer to evaporate the polymer solvent and the polymer non-solvent dries the wet polymer precipitate into the polymer material matrix. The removal of the intermingled polymer non-solvent provides the polymer material matrix with a network of interconnected pores that is uniformly defined throughout the polymer material matrix in all directions. The uniform distribution of the hydrophobic-treated ceramic particles and their weak interfacial surface interaction with the polymer material matrix exacerbates the size, pore density, complexity, and extent of the network of interconnected pores.

After removal of the polymer solvent and the polymer non-solvent, the porous thin-film separator comprises about 10 wt. % to about 95 wt. %, more preferably about 50 wt. % to about 90 wt. %, of the polymer material matrix and about 5 wt. % to about 90 wt. %, more preferably about 10 wt. % to about 50 wt. %, of the hydrophobic-treated ceramic particles uniformly distributed throughout the polymer material matrix. The separator is porous and handleable, and the polymer material matrix includes opposed major face surfaces that define a separator thickness ranging from about 20 μm to about 50 μm. Extending coextensively between the opposed major face surfaces is the network of interconnected pores that provides the polymer material matrix with a void volume of about 20% to about 80%. The bulk and surface porosity of the polymer material matrix fluidly connects the opposed major face surfaces and permits adequate infiltration of a liquid electrolyte solution so that ionic conductivity through the separator can be maintained during operation of an electrochemical battery cell within a lithium ion battery.

To illustrate a specific example, the phase separation process just described can be used to make a porous thin-film separator comprised of PEI. The PEI is first dissolved in a latent polymer solvent, such as dimethylformamide (DMF), at a temperature above 80° C. followed by dispersion of hydrophobic-treated fumed silica particles. The resultant polymer slurry may contain about 10 wt. % to about 20 wt. % of the PEI and about 20 wt. % to about 25 wt. % of the hydrophobic-treated fumed silica particles based on the weight of the PEI (i.e., about 2 wt. % to about 5 wt. % of the polymer slurry). The polymer slurry is then cast onto a flat glass surface by slot die coating and allowed to cool to room temperature. During cooling, the cast polymer slurry layer transforms from clear to opaque as the dissolved PEI precipitates. The DMF is then extracted by washing the cast polymer slurry layer with water. After solvent exchange, the PEI precipitated thin-film layer is heated to evaporate any residual DMF along with the water to produce the porous thin-film PEI separator with a uniform internal dispersal of the hydrophobic-treated fumed silica particles. The separator may, of course, be subjected to further processing such as cutting or shaping before being used in a lithium ion battery.

The same porous thin-film PEI separator may also be fabricated using a real polymer solvent, such as N-Methyl-2-Pyrrolidone (NMP), instead of a latent polymer solvent to make the polymer slurry. In this manner, the PEI is first dissolved in NMP at room temperature of about 18° C. to about 24° C. followed by dispersion of the hydrophobic-treated fumed silica particles. The resultant polymer slurry contains the same amounts of PEI and the hydrophobic-treated fumed silica particles as before. The polymer slurry is then cast onto a flat glass surface by slot die coating. The cast polymer slurry layer remains clear as the PEI does not generally precipitate out of NMP at room temperature. The NMP is then extracted by placing the cast polymer slurry layer in a humidity chamber maintained above 90% relative humidity for 10 seconds to 2 minutes and, afterwards, washing with water. After solvent exchange, the PEI precipitated thin-film layer is heated to evaporate any residual NMP along with the water to produce the porous thin-film PEI separator with a uniform internal dispersal of the hydrophobic-treated fumed silica particles.

An engineered polymer separator fabricated by the phase separation method just disclosed (hereafter "separator") may be used in a wide variety of lithium ion battery configurations. An exemplary and generalized illustration of a lithium ion battery 10 is depicted in FIG. 1. The lithium ion battery 10 shown here includes several rectangularly-shaped electrochemical battery cells 12 that are each bracketed by metallic current collectors. The electrochemical battery cells 12 are stacked side-by-side in a modular configuration and connected in series (although a parallel connection is also permitted). The lithium ion battery 10 can be connected serially or in parallel to other similarly constructed lithium ion batteries to form a lithium ion battery pack that exhibits the voltage and current capacity demanded for a particular application. It should be understood the lithium ion battery 10 shown here is only a schematic illustration. FIG. 1 is meant to show the relative position and physical interactions of the various components that constitute the electrochemical battery cells 12 (i.e., the electrodes and the separator); it is not intended to inform the relative sizes of the electrochemical battery cells' components, to define the number of electrochemical battery cells 12 in the lithium ion battery 10, or to limit the wide variety of structural configurations the lithium ion battery 10 may assume. Various structural modifications to the lithium ion battery 10 shown in FIG. 1 are possible despite what is explicitly illustrated.

The electrochemical battery cell 12 contained in the lithium ion battery 10 includes a negative electrode 14, a positive electrode 16, and the separator 18 situated between the two electrodes 14, 16. Each of the negative electrode 14, the positive electrode 16, and the separator 18 is wetted with a liquid electrolyte solution that is able to communicate lithium ions. A negative-side metallic current collector 20 that includes a negative polarity tab 22 is located between the negative electrodes 14 of adjacent electrochemical cells 12. Likewise, a positive-side metallic current collector 24 that includes a positive polarity tab 26 is located between neighboring positive electrodes 16. The negative polarity tab 22 is electrically coupled to a negative terminal 28 and the positive polarity tab 26 is electrically coupled to a positive terminal 30. An applied compressive force usually presses the metallic current collectors 20, 24, against the electrodes 14, 16 and the electrodes 14, 16 against the separator 18 to achieve intimate interfacial contact between adjacent contacting components.

Figure 2:
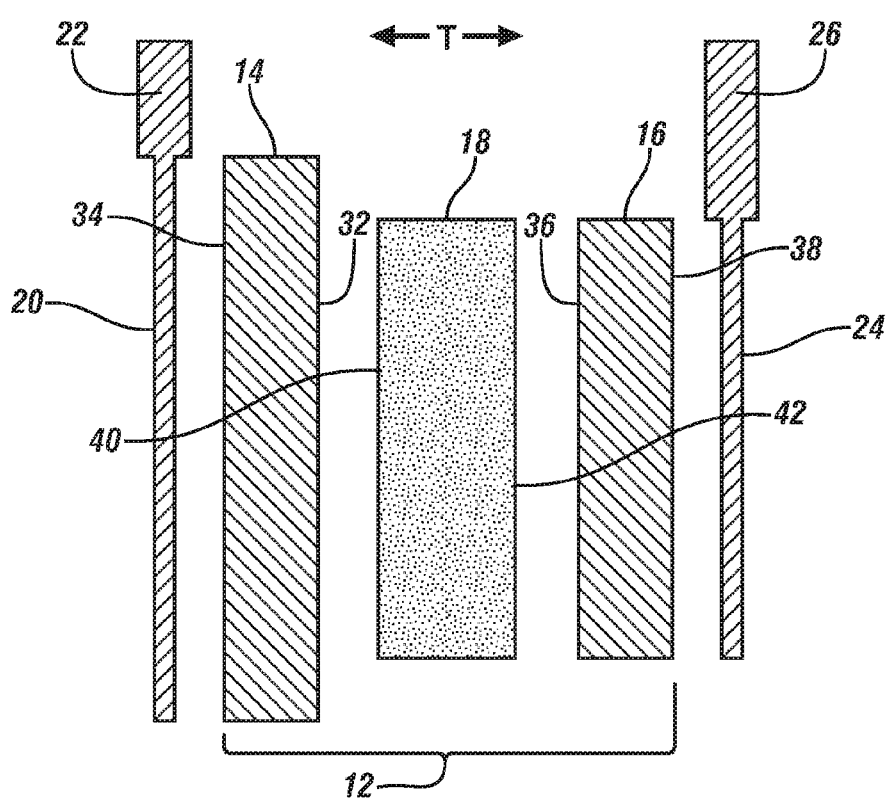
FIG. 2 is an exploded cross-sectional view of one of the electrochemical battery cells shown in FIG. 1 along with its associated metallic current collectors. The components of the electrochemical battery cell and the metallic current collectors are idealized representations that are not necessarily drawn to scale.

An exploded cross-sectional view of the electrochemical battery cell 12 and its associated metallic current collectors 20, 24 is generally illustrated in FIG. 2. The negative electrode 14 includes an inner face surface 32 and an outer face surface 34 relative to the location of the separator 18. The positive electrode 14 similarly includes an inner face surface 36 and an outer face surface 38. The inner face surface 32 of the negative electrode 14 may, but is not required to, encompass a larger two-dimensional surface area than the inner face surface 36 of the positive electrode 16, as shown. When assembled into the electrochemical battery cell 12, the inner face surfaces 32, 36 of the negative and positive electrodes 14, 16 confront one another and are pressed against a negative-side major face surface 40 and a positive-side major face surface 42 of the separator 18, respectively. Such pressed-engagement occurs generally uniformly along the entire interface of the major face surfaces 40, 42 of the separator 18 and the corresponding portions of the inner face surfaces 32, 36 of the electrodes 14, 16. The negative-side metallic current collector 20 is formed against the outer face surface 34 of the negative electrode 14 and the positive-side metallic current collector 24 is formed against the outer face surface 38 of the positive electrode 16. Both of the metallic current collectors 20, 24 engage their respective electrode outer face surfaces 34, 38 over an appreciable interfacial surface area to facilitate the efficient collection and distribution of free electrons.

The electrochemical cell 12 is generally thin and flexible. A typical thickness of the electrochemical cell 12 extending from the outer face surface 34 of the negative electrode 12 to the outer face surface 38 of the positive electrode 16 is about 80 μm to about 350 μm. Each electrode 14, 16 is preferably about 30 μm to 150 μm thick and, as already mentioned, the separator 18 is about 20 μm to 50 μm thick. The metallic current collectors 20, 24 are normally about 5 μm to 20 μm thick. The relatively thin and flexible nature of the electrochemical cell 12 and its associated metallic current collectors 20, 24 allows them to be rolled, folded, bent, or otherwise maneuvered into a variety of lithium ion battery configurations depending on design specifications and spatial constraints. The lithium ion battery 10 may, for example, include a number of distinct electrochemical cells 12 that have been fabricated, cut, aligned, and layed-up next to one another or, in an alternative embodiment, the cells 12 may be derived from a continuous layer that is folded back-and-forth over itself many times.

The negative electrode 14 includes a lithium host material that stores intercalated lithium at a relatively low electrochemical potential (relative to a lithium metal reference electrode) such as, for example, graphite or lithium titanate. The lithium host material may be intermingled with a polymeric binder material to provide the negative electrode 14 with structural integrity. The lithium host material is preferably graphite and the polymeric binder material is preferably one or more of polyvinyldiene fluoride (PVdF), an ethylene propylene diene monomer (EPDM) rubber, or a carboxymethoxy cellulose (CMC). Graphite is normally used to make the negative electrode 14 because, on top of being relatively inert, its layered structure exhibits favorable lithium intercalation and deintercalation characteristics which help provide the electrochemical battery cell 12 with a suitable energy density. Commercial forms of graphite that may be used to construct the negative electrode 14 are available from Timcal Graphite and Carbon (headquartered in Bodio, Switzerland), Lonza Group (headquartered in Basel, Switzerland), and Superior Graphite (headquartered in Chicago, Ill.). The negative-side metallic current collector 20 associated with the negative electrode 14 is preferably a thin-film copper foil that coextensively contacts the outer face surface 34 of the negative electrode 14.

The positive electrode 16 includes a lithium-based active material that stores intercalated lithium at a higher electrochemical potential than the lithium host material used to make the negative electrode 14 (also relative to a lithium metal reference electrode). The same polymeric binder materials that may be used to construct the negative electrode 14 (PVdF, EPDM, CMC) may also be intermingled with the lithium-based active material to provide the positive electrode 16 with structural integrity. The lithium-based active material is preferably a layered lithium transition metal oxide, such as lithium cobalt oxide ($LiCoO_2$), a spinel lithium transition metal oxide, such as spinel lithium manganese oxide ($LiMn_xO_y$), a lithium polyanion, such as a nickel-manganese-cobalt oxide [$Li(Ni_xMn_yCo_z)O_2$], lithium iron phosphate ($LiFePO_4$), or lithium fluorophosphate ($Li_2FePO_4F$), or a mixture of any of these materials. Some other suitable lithium-based active materials that may be employed as all or part of the lithium-based active material include lithium nickel oxide ($LiNiO_2$), lithium aluminum manganese oxide ($Li_xAl_yMn_{1-y}O_2$), and lithium vanadium oxide ($LiV_2O_5$), to name but a few alternatives. The positive-side metallic current collector 24 associated with the positive electrode 16 is preferably a thin-film aluminum foil that coextensively contacts the outer face surface 38 of the positive electrode 16.

The separator 18 functions as a thin and electrically insulative mechanical barrier layer that physically separates the confronting inner face surfaces 32, 36 of the electrodes 14, 16 to prevent a short-circuit in the electrochemical battery cell 12. The separator 18 is also sufficiently porous to permit infiltration of the liquid electrolyte solution and the internal passage of dissolved lithium ions. A rise in temperature that breaches 130° C. in the electrochemical cell 12 can be endured by the separator 18 without a sacrifice in functionality. The engineering polymer material contained in the separator 18 will not soften, melt, or chemically react with the liquid electrolyte solution at such temperatures as is often the case with a polyolefin. The ability of the separator 18 to withstand potential spikes in temperature provides the electrochemical battery cell 12 with durability and helps prevent short-circuit events that may cause the cell 12 to lose capacity or fail altogether.

The liquid electrolyte solution infiltrated into the separator 18, and which wets both electrodes 14, 16, is preferably a lithium salt dissolved in a non-aqueous solvent. Some suitable lithium salts that may be used to make the liquid electrolyte solution include $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts. The non-aqueous solvent in which the lithium salt is dissolved may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture that includes one or more of these solvents.

Referring back to FIG. 1, the negative and positive terminals 28, 30 of the lithium ion battery 10 may be connected to an electrical device 50 that generally encompasses power-consuming and power-generating devices. A power-consuming device is one that is powered fully or partially by the lithium ion battery 10 when operating in a discharge state. Conversely, a power-generating device is one that charges or re-powers the lithium ion battery 10. The power-consuming device and the power-generating device can be the same device in some instances. For example, the electrical device 50 may be an electric motor for a hybrid electric or an extended range electric vehicle that is designed to draw an electric current from the lithium ion battery 10 during acceleration and provide a regenerative electric current to the lithium ion battery 10 during deceleration. The power-consuming device and the power-generating device can also be different devices. For example, the power-consuming device may be an electric motor for a hybrid electric or an extended range electric vehicle and the power-generating device may be an AC wall outlet, an internal combustion engine, and/or a vehicle alternator.

The lithium ion battery 10 can provide a useful electrical current to the electrical device 50 by way of reversible electrochemical reactions that occur in the electrochemical battery cell 12 when a closed-circuit connects the negative terminal 28 and the positive terminal 30 at a time when the negative electrode 14 contains a sufficient quantity of intercalated lithium (i.e., battery discharge). The electrochemical potential difference between the negative electrode 14 and the positive electrode 16—approximately 2.5 to 4.3V depending on the composition of the electrodes 14, 16—drives the oxidation of intercalated lithium contained in the negative electrode 14. Free electrons produced by this oxidation reaction are collected by the negative-side current collector 20 and supplied to the negative terminal 28. A flow of free electrons is harnessed and directed through the electrical device 50 from the negative terminal 28 to the positive terminal 30 and eventually to the positive electrode 16 by way of the positive-side current collector 24. Lithium ions, which are also produced at the negative electrode 14, are concurrently carried through the separator 18, more specifically through the tortuous and interconnected network of pores defined in the polymer material matrix, by the liquid electrolyte solution in route to the positive electrode 16. The flow of free electrons through the electrical device 50 from the negative terminal 28 to the positive terminal 30 can be continuously or intermittently provided until the negative electrode 14 is depleted of intercalated lithium and the capacity of the electrochemical battery cell 12 is spent.

The lithium ion battery 10 can be charged or re-powered at any time by applying an external voltage originating from the electrical device 50 to the electrochemical battery cell 12 to reverse the electrochemical reactions that occur during discharge. The applied external voltage compels the otherwise non-spontaneous oxidation of intercalated lithium contained in the positive electrode 16 to produce free electrons and lithium ions. The free electrons are collected by the positive-side current collector 24 and supplied to the positive terminal 30. A flow of the free electrons is directed to the negative terminal 28 and eventually to the negative electrode 14 by way of the negative-side current collector 20. The lithium ions are concurrently carried back through the separator 18 in the liquid electrolyte solution towards the negative electrode 14. The lithium ions and the free electrons eventually reunite and replenish the negative electrode 14 with intercalated lithium to prepare the electrochemical battery cell 12 for another discharge phase.

EXAMPLE

This Example demonstrates the tensile strength, ionic conductivity, and electrochemical cell cycle performance of a porous thin-film polymer separator, as described above, in comparison to a conventional monolayer polypropylene lithium ion battery separator obtained from Celgard, LLC (Charlotte, N.C.). The porous thin-film separator comprises a PEI polymer material matrix and a uniform internal dispersion of hydrophobic-treated fumed silica particles obtained from Cabot Corporation under the designation Cab-O-Sil®720. This particular separator is referred to in the remainder of this Example as the "inventive separator" for brevity.

The inventive separator was formed by a phase separation process in which a latent polymer solvent was used to make the polymer slurry. To begin, PEI was dissolved in dimethylformamide (DMF) at 90° C. followed by dispersion of the Cab-O-Sil®720 fumed silica particles. The resultant polymer slurry contained about 15 wt. % of the PEI and about 25 wt. % of the Cab-O-Sil®720 fumed silica particles based on the weight of the PEI (i.e., about 3.7-3.8 wt. % of the polymer slurry). The polymer slurry was then cast onto a flat glass plate by slot die coating and allowed to cool to room temperature. During cooling, the cast polymer slurry layer transformed from clear to opaque as the PEI precipitated. The DMF was then extracted by washing the opaque cast polymer slurry layer with water. Afterwards, the PEI precipitated thin-film layer was heated to evaporate any residual DMF along with the water to produce the inventive separator.

Figure 3:
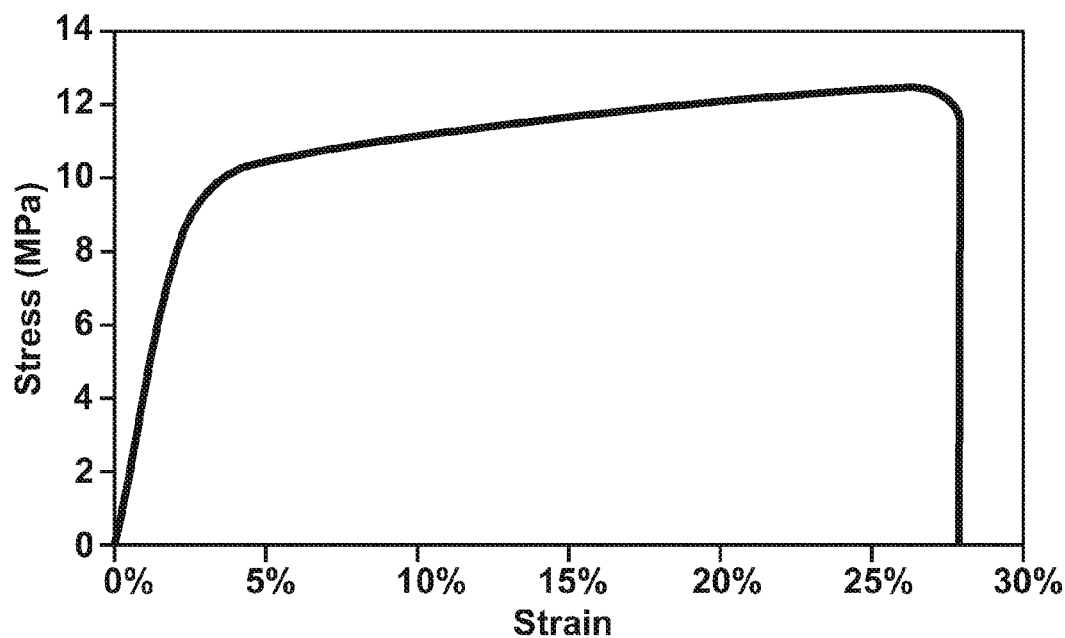
FIG. 3 is a graph that shows the tensile behavior of a porous thin-film polymer separator prepared according to one embodiment of the disclosed phase separation method.

The tensile behavior of the inventive separator is shown in FIG. 3. The inventive separator was tested on an Instron 5582 according to ASTM D882-09 with a cross-head speed of 10 mm/min to determine its tensile strength. As shown, the inventive separator had a tensile strength of over 12 MPa. And, as a result, it would be expected to survive any winding machines or other process equipment that may be used to assemble or configure an electrochemical battery cell for a lithium ion battery.

The effective ionic conductivities of the inventive separator and the conventional monolayer polypropylene separator were determined by placing the separators, which were soaked with 1 M LiPF$_6$ in ethylene carbonate/diethyl carbonate (1:2 volumetric ratio) as the liquid electrolyte solution, between two stainless steel electrodes. An impedance analyzer was used to measure the bulk resistance across the separators. The effective ionic conductivity of each separator was then calculated by the following equation in which t is the thickness of the separator, S is the surface area of each face of the separator, and R$_b$ is the bulk resistance as measured by the impedance analyzer.

$$\sigma(mS/cm) = \frac{t}{R_b \times S}$$

The effective conductivities of the inventive separator and the conventional monolayer polypropylene separator are shown below in Table 2. The inventive separator demonstrated a better effective ionic conductivity.

TABLE 2

Effective Ionic Conductivity

| Separator | t (μm) | S (cm$^2$) | R$_b$ (Ω) | $\sigma_{eff}$ (mS/cm) |
|---|---|---|---|---|
| Inventive Separator | 18 | 6.6 | 0.19 | 1.43 |
| Celgard 2400 | 25 | 6.6 | 0.39 | 0.97 |

Figure 4:
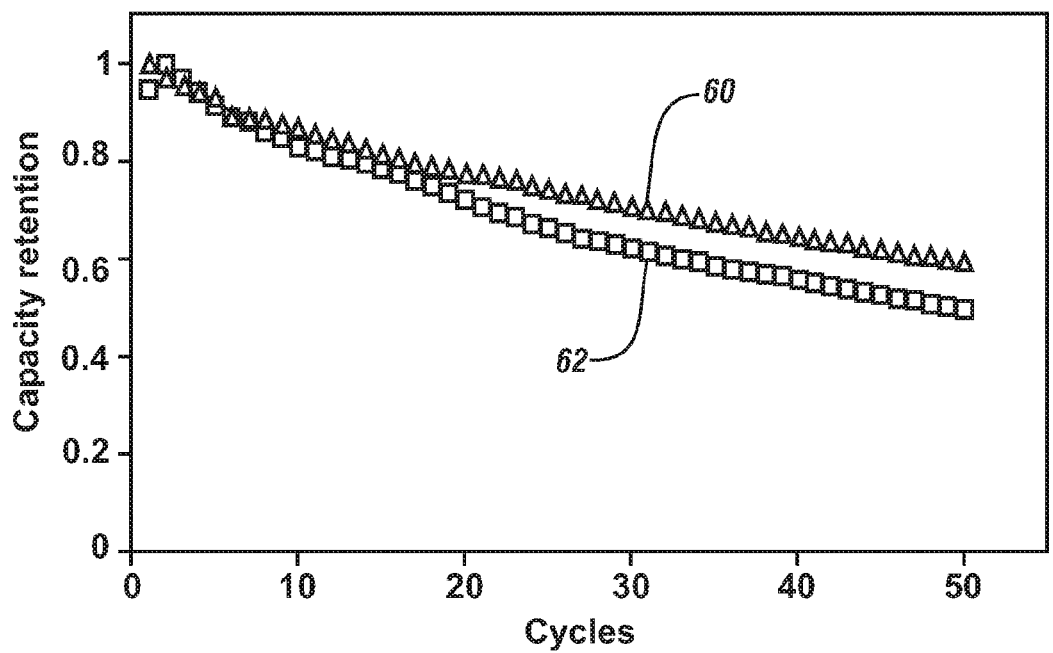
FIG. 4 is a graph that compares the cycle performance of a porous thin-film polymer separator prepared according to one embodiment of the disclosed phase separation method and a conventional monolayer polypropylene separator.

The cycle performance of the inventive separator and the conventional monolayer polypropylene separator is shown in FIG. 4. The cycle performance testing was carried out with a Maccor Series 4000 battery tester at 30° C. The negative electrode and the positive electrode materials used were LiNi$_{1/3}$Co$_{1/3}$Mn$_{1/3}$O$_2$ (TODA NCM-01$^{ST}$-100) and graphite (TIMREX SLP 30), respectively. Carbon black (TIMREX super P Li carbon black) was used in both electrodes as a conductive additive and PVdF (Kynar HSV 900 from Arkema Inc., Philadelphia, Pa.) was used as a polymeric binder material to provide structural integrity to the electrodes. Two CR2325-type coin cells were assembled with the electrodes, one or the other of the separators (inventive or conventional), and 1 M LiPF$_6$ in ethylene carbonate/diethyl carbonate (1:2 volumetric ratio) as the liquid electrolyte solution. The cells were charged to 4.3 V under a constant-current constant-voltage mode, and then discharged to 3.0 V under a constant-current mode. For the cycle test, the cells were charged and discharged at a C/5 rate (charge/discharge occurred over 5 hours) for the first ten cycles, and then charged and discharged at a C/2 rate (charge/discharge occurred over 2 hours) for the remaining cycles. The percent of capacity retained for the cell with the inventive separator (identified as plot 60) and the cell with the conventional monolayer polypropylene separator (identified as plot 62) were plotted after each completed cycle up to 50 cycles. As shown in FIG. 4, the cell that contained the inventive separator demonstrated better capacity retention over 50 cycles than the cell that contained the conventional monolayer polypropylene separator.

The above description of exemplary embodiments and specific examples are merely descriptive in nature and not intended to limit the scope of the claims that follow.

The invention claimed is:

1. A method of making a separator that, in a lithium ion battery, is sandwiched between a negative electrode and a positive electrode to provide an electrically insulative physical barrier that mechanically separates the two electrodes, the method comprising:

forming a polymer slurry into a wet thin-film layer of a desired thickness, the polymer slurry comprising a polymer solvent in which a polymer material is dissolved and hydrophobic-treated ceramic particles are dispersed, the hydrophobic-treated ceramic particles having diameters that range from about 0.005 μm to about 15 μm;

exposing the wet thin-film layer to a polymer non-solvent to form a solvent-exchanged thin-film precipitated polymer layer in which at least 70 wt. % of the polymer solvent contained in the wet thin-film layer is replaced with the polymer non-solvent; and heating the solvent-exchanged thin-film precipitated polymer layer to evaporate the polymer solvent, if any, and the polymer non-solvent to form a porous thin-film polymer separator that comprises about 10 wt. % to about 95 wt. % of a polymer material matrix having opposed major face surfaces and about 5 wt. % to about 90 wt. % of the hydrophobic-treated ceramic particles distributed throughout the polymer material matrix, the polymer material matrix defining a network of interconnected pore openings that extends coextensively between the major face surfaces, the interconnected network of pore openings providing the polymer material matrix with a void volume of about 20% to about 80%.

2. The method of claim 1, wherein the polymer material is an engineering polymer material selected from the group consisting of polyetherimide, polyvinylidene fluoride, polyethersulfone, polysulfone, polyphenylsulfone, polyacrylonitrile, poly(methyl methacrylate), an aliphatic polyimide, or a mixture thereof.

3. The method of claim 1, wherein the hydrophobic-treated ceramic particles are selected from the group consisting of alumina, titania, silica, ceria, zirconia, silicon carbide, boron carbide, titanium nitride, silicon nitride, titanium silicide, tungsten silicide, aluminum boride, titanium boride, mullite, spodumene, zirconium silicate, sillimanite, petalite, or a mixture thereof, that have been subjected to a hydrophobic treatment.

4. The method of claim 3, wherein the hydrophobic-treated ceramic particles comprise fumed silica particles that have been modified through a silanol condensation reaction to include surface-substituted organosilicon polymer compounds.

5. The method of claim 4, wherein the surface-substituted organisilicon polymer compounds are derived from octylsilane or polydimethylsiloxane.

6. The method of claim 1, wherein the hydrophobic-treated ceramic particles have particle diameters 0.05 μm to about 3 μm.

7. The method of claim 1, wherein the desired thickness of the wet thin-film layer results in the porous thin-film polymer separator having a thickness that ranges from about 20 μm to about 50 μm.

8. The method of claim 1, wherein the porous thin-film polymer separator comprises about 50 wt. % to about 90 wt. % of the polymer material matrix and about 10 wt. % to about 50 wt. % of the hydrophobic-treated ceramic particles distributed throughout the polymer material matrix.

9. The method of claim 1, wherein forming the polymer slurry into the wet thin-film layer of a desired thickness comprises:

heating a latent polymer solvent for the polymer material to an elevated temperature conducive to solvation of the polymer material;

dissolving the polymer material into the latent polymer solvent at the elevated temperature;

dispersing the hydrophobic-treated heat resistant particles into the latent polymer solvent to form the polymer slurry;

forming the polymer slurry into the wet thin-film layer to the desired thickness; and allowing wet thin-film layer to cool to a temperature that induces precipitation of the polymer material out of the polymer slurry within the wet thin-film layer.

10. The method of claim 9, wherein allowing the wet-thin film layer to cool and exposing the wet thin-film layer to the polymer non-solvent occur simultaneously.

11. The method of claim 1, wherein forming the polymer slurry into the wet thin-film layer of a desired thickness comprise:

dissolving the polymer material into a real polymer solvent for the polymer material;

dispersing the hydrophobic-treated heat resistant particles into the latent polymer solvent to form the polymer slurry; and forming the polymer slurry into the wet thin-film layer to the desired thickness.

12. The method of claim 1, wherein the polymer slurry comprises about 5 wt. % to about 35 wt. % of the polymer material and about 5 wt. % to about 900 wt. % of the hydrophobic-treated ceramic particles based on the weight of the polymer material.

13. The method of claim 1, wherein the polymer non-solvent is water.

14. A method of making a separator that, in a lithium ion battery, is sandwiched between a negative electrode and a positive electrode to provide an electrically insulative physical barrier that mechanically separates the two electrodes, the method comprising:

forming a polymer slurry into a wet thin-film layer of a desired thickness, the polymer slurry comprising a polymer solvent in which a polymer material is dissolved and hydrophobic-treated ceramic particles are uniformly dispersed, the hydrophobic-treated ceramic particles having diameters that range from about 0.005 μm to about 15 μm, and the polymer slurry comprising about 5 wt. % to about 35 wt. % of the polymer material and about 10 wt. % to about 100 wt. % of the hydrophobic-treated ceramic particles based on the weight of the polymer material;

exposing the wet thin-film layer to a polymer non-solvent to form a solvent-exchanged thin-film precipitated polymer layer in which at least 70 wt. % of the polymer solvent contained in the wet thin-film layer is replaced with the polymer non-solvent; and heating the solvent-exchanged thin-film precipitated polymer layer to evaporate the polymer solvent, if any, and the polymer non-solvent to form a porous thin-film polymer separator having a thickness that ranges from about 20 μm to about 50 μm, the separator comprising a polymer material matrix having opposed major face surfaces and the hydrophobic-treated ceramic particles distributed throughout the polymer material matrix, the polymer material matrix defining a network of interconnected pore openings that extends coextensively between the major face surfaces, the interconnected network of pore openings providing the polymer material matrix with a void volume of about 20% to about 80%.

15. The method of claim 14, wherein the polymer material is an engineering polymer material selected from the group consisting of polyetherimide, polyvinylidene fluoride, polyethersulfone, polysulfone, polyphenylsulfone, polyacrylonitrile, poly(methyl methacrylate), an aliphatic polyamide, or a mixture thereof.

16. The method of claim 14, wherein the hydrophobic-treated ceramic particles comprise fumed silica particles that have been modified through a silanol condensation reaction to include surface-substituted organosilicon polymer compounds.

17. The method of claim 14, wherein the polymer non-solvent is water.

18. The method of claim 14, wherein forming the polymer slurry into the wet thin-film layer of a desired thickness comprises:
heating a latent polymer solvent for the polymer material to an elevated temperature conducive to solvation of the polymer material, wherein the polymer material comprises at least one of polyetherimide or polyvinylidene fluoride;
dissolving the polymer material into the latent polymer solvent at the elevated temperature;
dispersing the hydrophobic-treated heat resistant particles into the latent polymer solvent to form the polymer slurry;
forming the polymer slurry into the wet thin-film layer to the desired thickness; and
allowing the wet thin-film layer to cool to a temperature that induces precipitation of the polymer material out of the polymer slurry within the wet thin-film layer.

19. The method of claim 18, wherein allowing the wet-thin film layer to cool and exposing the wet thin-film layer to the polymer non-solvent occur simultaneously in a bath of the polymer non-solvent.

20. The method of claim 14, wherein forming the polymer slurry into the wet thin-film layer of a desired thickness comprises:
dissolving the polymer material into a real polymer solvent for the polymer material, wherein the polymer material comprises at least one of polyetherimide or polyvinylidene fluoride;
dispersing the hydrophobic-treated heat resistant particles into the latent polymer solvent to form the polymer slurry; and
forming the polymer slurry into the wet thin-film layer to the desired thickness.

* * * * *